(12) United States Patent
McClear et al.

(10) Patent No.: US 9,468,070 B2
(45) Date of Patent: Oct. 11, 2016

(54) COLOR CONTROL OF LIGHT EMITTING DEVICES AND APPLICATIONS THEREOF

(75) Inventors: Mark McClear, Cary, NC (US); Paul Thieken, Raleigh, NC (US)

(73) Assignee: CREE INC., Durham, NC (US)

( * ) Notice: Subject to any disclaimer, the term of this patent is extended or adjusted under 35 U.S.C. 154(b) by 285 days.

(21) Appl. No.: 12/706,370

(22) Filed: Feb. 16, 2010

(65) Prior Publication Data

US 2011/0199019 A1 Aug. 18, 2011

(51) Int. Cl.
*H05B 37/02* (2006.01)
*H05B 33/08* (2006.01)

(52) U.S. Cl.
CPC ...... *H05B 33/0872* (2013.01); *H05B 33/0827* (2013.01); *Y02B 20/341* (2013.01)

(58) Field of Classification Search
USPC ............ 315/185 R, 186, 192, 291, 294, 295, 315/297, 312; 313/498, 501, 502, 503; 362/227, 230, 231, 249.02, 800
See application file for complete search history.

(56) References Cited

U.S. PATENT DOCUMENTS

| | | |
|---|---|---|
| 3,760,237 A | 9/1973 | Jaffe |
| 4,307,297 A | 12/1981 | Groff et al. |
| 4,511,425 A | 4/1985 | Boyd et al. |
| 4,946,547 A | 8/1990 | Palmour et al. |
| 5,040,868 A | 8/1991 | Waitl |
| 5,130,761 A | 7/1992 | Tanaka |
| 5,167,556 A | 12/1992 | Stein |
| 5,200,022 A | 4/1993 | Kong et al. |
| RE34,861 E | 2/1995 | Davis et al. |
| 5,453,405 A | 9/1995 | Fan et al. |
| 5,643,834 A | 7/1997 | Harada et al. |
| 5,703,401 A | 12/1997 | Van De Water et al. |
| 6,061,160 A | 5/2000 | Maruyama |
| 6,066,861 A | 5/2000 | Hohn et al. |
| 6,093,940 A | 7/2000 | Ishinaga et al. |
| 6,132,072 A | 10/2000 | Turnbull et al. |
| 6,183,100 B1 | 2/2001 | Suckow et al. |
| 6,224,216 B1 | 5/2001 | Parker et al. |
| 6,259,608 B1 | 7/2001 | Berardinelli et al. |
| 6,296,367 B1 | 10/2001 | Parsons et al. |
| 6,297,598 B1 | 10/2001 | Wang et al. |
| 6,359,236 B1 | 3/2002 | DiStefano et al. |
| 6,376,902 B1 | 4/2002 | Arndt |
| 6,454,437 B1 | 9/2002 | Kelly |
| 6,469,321 B2 | 10/2002 | Arndt |
| 6,476,410 B2 | 11/2002 | Ishinaga |
| 6,501,084 B1 | 12/2002 | Sakai et al. |

(Continued)

FOREIGN PATENT DOCUMENTS

| | | |
|---|---|---|
| CN | 101379889 A1 | 3/2009 |
| DE | 10 2007 044556 | 3/2009 |

(Continued)

OTHER PUBLICATIONS

Patent Cooperation Treaty, International Search Report, International Application No. PCT/US2011/024328, mailed May 19, 2011.

*Primary Examiner* — Thai Pham
(74) *Attorney, Agent, or Firm* — Smith Moore Leatherwood LLP; J. Clinton Wimbish (57) ABSTRACT

The present invention, in one aspect, provides light emitting devices comprising LEDs, the light emitting devices, in some embodiments, having a simplified architecture for controlling the color of emitted light.

29 Claims, 5 Drawing Sheets (56) References Cited

U.S. PATENT DOCUMENTS

| | | |
|---|---|---|
| 6,573,537 B1 | 6/2003 | Steigerwald et al. |
| 6,573,580 B2 | 6/2003 | Arndt |
| 6,577,073 B2 | 6/2003 | Shimizu et al. |
| 6,610,563 B1 | 8/2003 | Waitl et al. |
| 6,614,058 B2 | 9/2003 | Lin et al. |
| 6,617,795 B2 | 9/2003 | Bruning |
| 6,624,491 B2 | 9/2003 | Waitl et al. |
| 6,661,029 B1 | 12/2003 | Duggal |
| 6,680,490 B2 | 1/2004 | Yasukawa et al. |
| 6,686,609 B1 | 2/2004 | Sung |
| 6,707,069 B2 | 3/2004 | Song et al. |
| 6,710,373 B2 | 3/2004 | Wang |
| 6,739,735 B2 | 5/2004 | Talamo et al. |
| 6,759,733 B2 | 7/2004 | Arndt |
| 6,770,498 B2 | 8/2004 | Hsu |
| 7,202,613 B2 | 4/2007 | Morgan et al. |
| 8,598,809 B2 | 12/2013 | Negley et al. |
| 2006/0049332 A1* | 3/2006 | Vornsand et al. ............ 250/205 |
| 2007/0188427 A1 | 8/2007 | Lys et al. |
| 2009/0050907 A1* | 2/2009 | Yuan et al. ..................... 257/88 |
| 2009/0167185 A1 | 7/2009 | Cheng |
| 2009/0195189 A1 | 8/2009 | Zampini et al. |
| 2009/0237006 A1 | 9/2009 | Champion et al. |
| 2010/0002440 A1* | 1/2010 | Negley et al. ........... 362/249.14 |
| 2010/0103660 A1 | 4/2010 | Van De Ven et al. |
| 2010/0103678 A1* | 4/2010 | Van De Ven et al. ........ 362/294 |
| 2010/0127283 A1 | 5/2010 | Van De Ven et al. |
| 2010/0140633 A1 | 6/2010 | Emerson |
| 2010/0148703 A1 | 6/2010 | Mizuno |
| 2010/0219770 A1 | 9/2010 | Kim et al. |
| 2010/0259182 A1 | 10/2010 | Man et al. |
| 2011/0012143 A1* | 1/2011 | Yuan et al. ..................... 257/91 |
| 2011/0043137 A1* | 2/2011 | Negley et al. ................ 315/297 |
| 2011/0148327 A1 | 6/2011 | Van De Ven et al. |

FOREIGN PATENT DOCUMENTS

| | | |
|---|---|---|
| TW | 200950160 A1 | 12/2009 |
| WO | WO 2007/090283 | 8/2007 |

\* cited by examiner

COLOR CONTROL OF LIGHT EMITTING DEVICES AND APPLICATIONS THEREOF

FIELD

The present invention relates to light emitting devices and, in particular, to solid state light emitting devices.

BACKGROUND

Light emitting diodes (LED or LEDs) are solid state devices that convert electric energy into light, and generally comprise one or more active layers of semiconductor material sandwiched between oppositely doped layers. When a forward bias is applied across the doped layers, holes and electrons are injected into the active layer where they recombine to generate light. Light is emitted from the active layer and extracted to the surrounding environment from all transparent surfaces of the LED.

The human eye is sensitive to variations in color and can, therefore, detect relatively small differences in emission wavelengths of LEDs. Perceptible variations in color emitted by LED devices designed to emit a single color of light can reduce customer satisfaction and reduce overall acceptance of the device for commercial uses. To ensure that LED devices emit light within an acceptable color range, white and color LEDs used in manufacture of the devices can be tested and sorted by color or brightness into different bins, generally referred to in the art as binning. Each bin typically contains LEDs from one color and brightness group and is typically identified by a bin code. White emitting LEDs can be sorted by chromaticity (color) and luminous flux (brightness). Color LEDs can be sorted by dominant wavelength (color) and luminous flux (brightness), or in the case of certain colors such as royal blue, by radiant flux (brightness). LEDs can be shipped, such as on reels, containing LEDs from one bin and are labeled with the appropriate bin code.

LED binning is an effective method of providing LED devices having a light output of the desired color. However, the LED emission properties can be altered by various factors of the LED operating environment. Temperature fluctuations, for example, can alter LED emission properties resulting in a change in the color of light emitted from an LED device.

In order to address the alteration of LED emission properties, LED devices can incorporate one or more optical sensors to monitor the color of the emitted light. Changes in the color of emitted light are detected by the one or more optical sensors and a correction is made to return the emitted light to the original color setting of the LED device. As a result, LED devices incorporating optical color control apparatus can respond to dynamic operating conditions to provide a constant color of emitted light.

Optical color control systems, nevertheless, present several disadvantages. Optical color control systems, for example, increase the complexity and manufacturing cost of LED devices. Moreover, optical color control systems are often designed according to the specifications of the luminaire or fixture in which the LED devices will be disposed, thereby precluding LED device portability to various luminaire or fixture constructions. Optical control systems are additionally closed loop systems requiring a zeroing step to set the system to the correct emission parameters for controlling the color of emitted light. A zeroing step contributes to increases in manufacturing time and cost.

SUMMARY

The present invention, in one aspect, provides light emitting devices comprising LEDs, the light emitting devices, in some embodiments, having a simplified architecture for controlling the color of emitted light. In one embodiment, a light emitting device comprises a plurality of first LEDs and a plurality of second LEDs providing a light output of the light emitting device falling within a first chromaticity region at one or more first operating parameters and electrical circuitry for providing a first adjusted drive current value to the plurality first LEDs to provide the light output of the light emitting device falling within a defined second chromaticity region.

In some embodiments, the light emitting device further comprises electrical circuitry for providing a second adjusted drive current value to the plurality of second LEDs to provide a light output of the light emitting device falling within the defined second chromaticity region.

The first and/or second adjusted drive current values, in some embodiments, are predetermined and based on the identity, binning and/or number of the first and second LEDs. The first and/or second adjusted drive current values, in some embodiments, are based on one or more second operating parameters of the LED device. Moreover, in some embodiments, a light emitting device further comprises a reference guide providing the first and/or second adjusted drive current values.

In another aspect, the present invention provides methods of controlling the color of light emitted from a light emitting device. In one embodiment, a method of controlling the color of light emitted from a light emitting device comprises operating a plurality of first LEDs and a plurality of second LEDs at one or more first operating parameters to provide a light output of the light emitting device falling within a first chromaticity region, defining a second chromaticity region and providing a first adjusted drive current value to the plurality of first LEDs to provide the light output of the light emitting device falling within the defined second chromaticity region.

In some embodiments, a method further comprises providing a second adjusted drive current value to the plurality of second LEDs to provide the light output of the light emitting device falling within the defined second chromaticity region. The first and/or second adjusted drive current values, in some embodiments, are predetermined and based on the identity, binning and/or number of the first and second LEDs. In some embodiments, first and/or second adjusted drive current are based on one or more second operating parameters of the light emitting device. Additionally, in some embodiments, a method further comprises detecting a change in the one or more second operating parameters and providing a first corrective drive current to the plurality of first LEDs to maintain the light output of the light emitting device in the defined second chromaticity region.

In another embodiment, a method of controlling the color of light emitted from a light emitting device comprises defining a chromaticity region, providing a plurality of first LEDs, providing a plurality of second LEDs, providing a first drive current value to the first LEDs and selecting a second drive current value for the second LEDs from a reference guide to achieve a light output from the light emitting device falling within the defined chromaticity region, wherein the second drive current value is based on one or more operating parameters of the light emitting device.

These and other embodiments are described in greater detail in the detailed description which follows.

DETAILED DESCRIPTION

The present invention can be understood more readily by reference to the following detailed description, examples and drawings and their previous and following descriptions. Elements, apparatus and methods of the present invention, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

The present invention, in one aspect, provides light emitting devices comprising LEDs, the light emitting devices, in some embodiments, having a simplified architecture for controlling the color of emitted light. In one embodiment, a light emitting device comprises a plurality of first LEDs and a plurality of second LEDs providing a light output of the light emitting device falling within a first chromaticity region at one or more first operating parameters and electrical circuitry for providing a first adjusted drive current value to the plurality first LEDs to provide the light output of the light emitting device falling within a defined second chromaticity region.

In some embodiments, the light emitting device further comprises electrical circuitry for providing a second adjusted drive current value to the plurality of second LEDs to provide the light output of the light emitting device falling within the defined second chromaticity region.

The first and/or second adjusted drive current values, in some embodiments, are predetermined and based on the identity, binning and/or number of the first and second LEDs. In some embodiments, the predetermined first and/or second adjusted drive current values are also based on one or more second operating parameters of the light emitting device to achieve a light output of the light emitting device falling within the defined second chromaticity region. Moreover, in some embodiments, a light emitting device further comprises a reference guide providing the predetermined first and/or second adjusted drive current values.

Turning now to components of light emitting devices described herein, light emitting devices comprise a plurality of first LEDs and a plurality of second LEDs. In some embodiments, the plurality of first LEDs and the plurality of second LEDs have non-overlapping emission spectra. In other embodiments, the emission spectra of the first LEDs and the second LEDs at least partially overlap.

Moreover, in some embodiments, the plurality of first LEDs emit a color of light falling outside the first chromaticity region and/or defined second chromaticity region. The plurality of second LEDs, in some embodiments, emit a color of light falling outside the first chromaticity region and/or defined second chromaticity region. In some embodiments, the plurality of first LEDs and the plurality of second LEDs emit a color of light falling outside the first chromaticity region and/or second chromaticity region.

The first LEDs and second LEDs can comprise any type of LED not inconsistent with the objectives of the present invention. LEDs, for example, can have different semiconductor layers arranged in different manners and can emit various colors in different embodiments according to the present invention. LED structures, features, fabrication and operation are generally known in the art and only briefly discussed herein. Layers of the LEDs can be fabricated using known processes including, but not limited to, chemical vapor deposition (CVD) processes such as metal organic chemical vapor deposition (MOCVD). The layers of LEDs generally comprise an active layer/region sandwiched between first and second oppositely doped epitaxial layers, all of which are formed successively on a growth substrate. In some embodiments, LEDs can be formed on a wafer and then singulated for mounting in a package. It is understood that the growth substrate can remain part of the final singulated LED or the growth substrate can be fully or partially removed.

In some embodiments, additional layers and elements can also be included in the LEDs, including, but not limited to, buffer, nucleation, contact and current spreading layers as well as light extraction layers and elements. The active region, in some embodiments, can comprise single quantum well (SQW), multiple quantum well (MQW), double heterostructure or super lattice structures. The active region and doped layers may be fabricated from different material systems. In some embodiments, the active region and doped layers may be constructed from II/VI compounds, III/V compounds, group IV compounds of combinations thereof. In one embodiment, for example, the active region layers are constructed from group III nitride based material systems. Group III nitrides refer to those semiconductor compounds formed between nitrogen and the elements in group III of the periodic table, including aluminum (Al), gallium (Ga), and indium (In). Group III nitride based materials also encompasses ternary and quaternary compounds such as aluminum gallium nitride (AlGaN) and aluminum indium gallium nitride (AlInGaN). In one embodiment, for example, the doped layers comprise gallium nitride (GaN) and the active region comprises InGaN. In another embodiment, the doped layers comprise AlGaN, aluminum gallium arsenide (AlGaAs) or aluminum gallium indium arsenide phosphide (AlGaInAsP).

The growth substrate for LEDs can be made of several materials including sapphire, silicon carbide, aluminum nitride (AlN) or gallium nitride (GaN). In some embodiments, a suitable substrate comprises a 4H polytype of silicon carbide, although other silicon carbide polytypes can also be used including 3C, 6H and 15R polytypes. Silicon carbide can offer certain advantages, such as a closer crystal lattice match to group III nitrides in comparison to sapphire, resulting in group III nitride films exhibiting lower dislocation and other defect density as well as lower strain. Silicon carbide also has a very high thermal conductivity such that the total output power of group III nitride devices on silicon carbide is not limited by the thermal dissipation of the substrate (as may be the case with some devices formed on sapphire). SiC substrates are available from Cree Research, Inc., of Durham, N.C. and methods for producing them are set forth in the scientific literature as well as in a U.S. Pat. Nos. Re. 34,861; 4,946,547; and 5,200,022, which are hereby incorporated by reference in their entireties.

In some embodiments, suitable LEDs can also comprise a conductive current spreading structure and wire bond pads on the top surface, both of which are made of a conductive material and deposited using known methods. Some materials that can be used for conductive current spreading structure and/or wire bond pads include Au, Cu, Ni, In, Al, Ag or alloys thereof as well conducting oxides and transparent conducting oxides, such as indium tin oxide. In some embodiments, the current spreading structure can comprise conductive fingers arranged in a grid on the LEDs with the fingers spaced to enhance current spreading from the pads into the LEDs' top surface. In operation, an electrical signal can be applied to the pads through a wire bond, and the electrical signal spreads through the fingers of the current spreading structure and into the LEDs. Current spreading structures are often used in LEDs where the top surface is p-type, but can also be used for n-type materials.

In some embodiments, the first and/or second LEDs comprise LEDs coated with one or more phosphors. As provided herein, phosphors can absorb at least some of the LED light and emit a different wavelength of light such that the LED emits a combination of light from the LED and the phosphor. In some embodiments, for example, the first and/or second LEDs comprise white light emitting LEDs. A white light emitting LED, in some embodiments, comprises a LED that emits at blue wavelengths of the electromagnetic spectrum, and the phosphor absorbs some of the blue light and re-emits yellow light, thereby providing a white light combination of blue and yellow light from the LED.

In some embodiments, suitable phosphors comprise commercially available YAG:Ce, although a full range of broad yellow spectral emission is possible using conversion particles made of phosphors based on the $(Gd,Y)_3(Al,Ga)_5O_{12}$:Ce system, such as the $Y_3Al_5O_{12}$:Ce (YAG). Other yellow phosphors that can be used for white emitting LED chips comprise:

$Tb_{3-x}RE_xO_{12}$:Ce(TAG); RE=Y, Gd, La, Lu; or
$Sr_{2-x-y}Ba_xCa_ySiO_4$:Eu.

In another embodiment, the first and/or second LEDs comprise LEDs at least partially covered by a phosphor absorbing the LED light and emitting a red light. In some embodiments, red emitting phosphors comprise $Lu_2O_3$:$Eu^{3+}$; $(Sr_{2-x}La_x)(Ce_{1-x}Eu_x)O_4$; $Sr_2Ce_{1-x}Eu_xO_4$; $Sr_{2-x}Eu_x$-$CeO_4$; $SrTiO_3$:$Pr^{3+}$, $Ga^{3+}$; $CaAlSiN_3$:$Eu^{2+}$; or $Sr_2Si_5N_8$:$Eu^{3+}$.

LEDs can be coated with a phosphor according to several different methods. In some embodiments, LEDs can be coated with phosphors according to the methods described in U.S. patent application Ser. Nos. 11/656,759 and 11/899,790, both entitled "Wafer Level Phosphor Coating Method and Devices Fabricated Utilizing Method" which are incorporated herein by reference in their entireties. In other embodiments, LEDs can be coated with phosphor using other methods such as electrophoretic deposition (EPD) as described in U.S. patent application Ser. No. 11/473,089 entitled "Closed Loop Electrophoretic Deposition of Semiconductor Devices" which is also incorporated herein by reference in its entirety.

As described herein, in some embodiments, a first and/or second LED emits a color of light directly from the active region of the LED. LEDs emitting any desired color can be used in various embodiments of the present invention. In some embodiments, the first and/or second LEDs emit light falling within the red region of the electromagnetic spectrum.

The first LEDs, in some embodiments, are arranged in the light emitting device in one or more arrays. In some embodiments, an array of first LEDs is a one-dimensional array or string. In another embodiment, an array of first LEDs is a two-dimensional array. A two dimensional array, in some embodiments, is symmetrical or substantially symmetrical.

In some embodiments, the second LEDs are arranged in the light emitting device in one or more one-dimensional or two-dimensional arrays. In some embodiments wherein the first LEDs and second LEDs emit different colors of light, the first and second LEDs are arranged with respect to one another in a systematic geometrical order. In one embodiment, for example, the first LEDs and second LEDs are arranged in substantially circular arrays of about the same area. In some embodiments, the circular array of first LEDs is offset from the circular array of second LEDs.

The first and second LEDs can have any size not inconsistent with the objectives of the present invention. In some embodiments, the first and/or second LEDs have a chip size greater than about 500 μm. In another embodiment, the first and/or second LEDs have a chip size greater than about 700 μm. In some embodiments, the first and/or second LEDs have a chip size less than about 500 μm or greater than about 700 μm. The edges of the first and/or second LEDs, in some embodiments, have lengths ranging from about 0.4 to about 0.7 μm.

Light emitting devices, in some embodiments, comprise one or more additional LEDs working in conjunction with the plurality of first and second LEDs. LEDs in addition to the plurality of first and second LEDs, in some embodiments, are selected from any of the LED constructions described herein. Moreover, in some embodiments, additional LEDs are arranged in a light emitting device in one or more arrays. Additional LED arrays, in some embodiments, comprise one or two-dimensional arrays as described herein and can have any desired spatial arrangement with respect to the first and/or second LEDs.

The plurality of first LEDs and second LEDs provide a light output of the light emitting device falling within a first chromaticity region at one or more first operating parameters of the light emitting device.

The one or more first operating parameters, in some embodiments, comprise a first drive current value for the plurality of first LEDs and a second drive current value for the plurality of second LEDs. The first drive current value and the second drive current value, in some embodiments, are the same or substantially the same. In other embodiments, the first drive current value and the second drive current value are different. In one embodiment, for example, the first drive current value and the second drive current value are 150 mA.

Additionally, in some embodiments, the one or more first operating parameters comprise a first junction temperature $(T_{1j})$ of the first and second LEDs. A first junction temperature, in some embodiments, is determined according to a first solder point temperature $(T_{1sp})$ of the first and second LEDs. The first solder point temperature of the first and second LEDs can comprise any value not inconsistent with the objectives of the present invention. In some embodiments, $T_{1sp}$ is about 25° C.

When operated at the one or more first operating parameters, the first and second LEDs provide a light output of the light emitting device falling within a first chromaticity region. The first chromaticity region can comprise any area on the CIE 1931 chromaticity diagram. The first chromaticity region can be dependent upon the identity and number of the first and second LEDs as well as the one or more first parameters at which the first and second LEDs are operated. In some embodiments, the first chromaticity region is not predefined or predetermined to influence the selection of the identity, binning and/or number of the first LEDs and/or second LEDs of the light emitting device.

In some embodiments, the first chromaticity region comprises one or more of the quadrangles listed in Table I.

TABLE I

First Chromaticity Regions based on the CIE 1931 Chromaticity Diagram

| Chromaticity Region | x | y |
|---|---|---|
| A | 0.4380 | 0.4117 |
|   | 0.4443 | 0.4212 |
|   | 0.4508 | 0.4186 |
|   | 0.4445 | 0.4092 |
| B | 0.4445 | 0.4092 |
|   | 0.4508 | 0.4186 |
|   | 0.4573 | 0.4160 |
|   | 0.4510 | 0.4067 |
| C | 0.4510 | 0.4067 |
|   | 0.4573 | 0.4160 |
|   | 0.4638 | 0.4134 |
|   | 0.4573 | 0.4042 |
| D | 0.4573 | 0.4042 |
|   | 0.4638 | 0.4134 |
|   | 0.4701 | 0.4109 |
|   | 0.4636 | 0.4018 |
| E | 0.4636 | 0.4018 |
|   | 0.4701 | 0.4109 |
|   | 0.4764 | 0.4084 |
|   | 0.4698 | 0.3994 |
| F | 0.4698 | 0.3994 |
|   | 0.4764 | 0.4084 |
|   | 0.4825 | 0.4059 |
|   | 0.4760 | 0.3970 |
| G | 0.4760 | 0.3970 |
|   | 0.4825 | 0.4059 |
|   | 0.4887 | 0.4035 |
|   | 0.4820 | 0.3946 |
| H | 0.4820 | 0.3946 |
|   | 0.4887 | 0.4035 |
|   | 0.4947 | 0.4011 |
|   | 0.4880 | 0.3923 |

As described herein, a light emitting device of the present invention comprises electrical circuitry for providing a first adjusted drive current value to the first LEDs. Moreover, in some embodiments, a light emitting device further comprises electrical circuitry for providing a second adjusted drive current to the second LEDs. The first and/or second adjusted drive currents can alter the light output of the associated first and/or second LEDs to provide a light output of the light emitting device falling within a defined second chromaticity region.

In some embodiments, the electrical circuitry provides independent electrical control of the first LEDs and second LEDs, thereby permitting independent application of drive currents to the first and second LEDs. In one embodiment, the first LEDs are connected to a driver or current controller by electrical contacts that are independent from the electrical contacts connecting the second LEDs to the driver or current controller. In some embodiments, a first driver or current controller is used for the first LEDs and a second driver or current controller is used for the second LEDs. In another embodiment, a single driver or current controller having multiple independent channels is used for the electrical control of the first LEDs and the second LEDs. In some embodiments, wherein additional LEDs are present, an separate driver or current controller can be used to for the additional LEDs. In other embodiments, one or more channels of a multiple channel driver or current controller can be used for any additional LEDs.

Moreover, in some embodiments, the first LEDs are connected in series. In another embodiment, the first LEDs demonstrate a series/parallel interconnection. Similarly, in some embodiments, the second LEDs are connected in series. In another embodiment, the second LEDs demonstrate a series/parallel interconnection. In some embodiments, additional LEDs can demonstrate a series or series/parallel interconnection.

Figure 2:
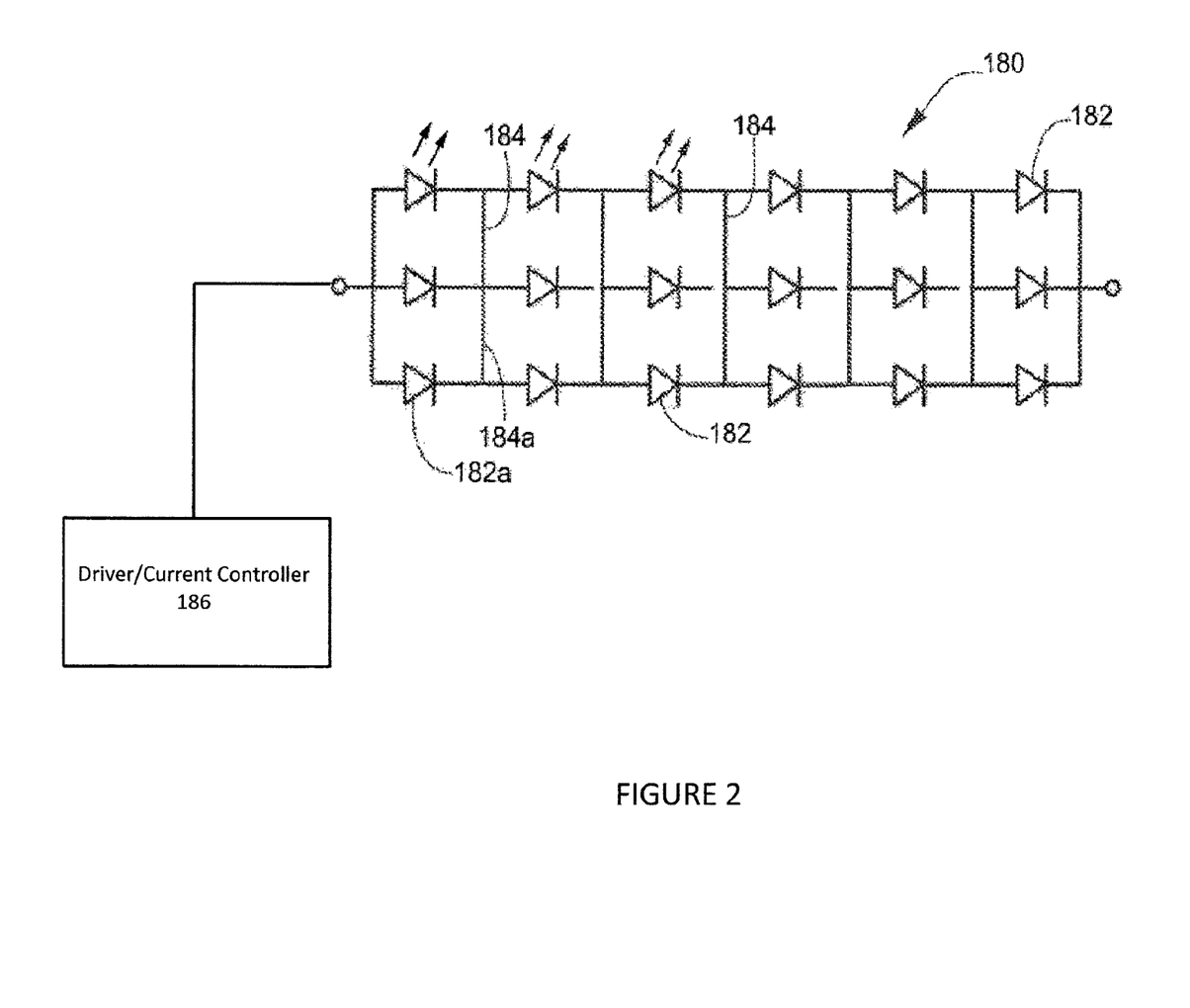
FIG. 2 illustrates a circuit diagram for LED interconnections according to one embodiment of a light emitting device of the present invention.

FIG. 2 illustrates a series/parallel interconnection of first LEDs according to one embodiment of the present invention. As illustrated in FIG. 2, eighteen first LEDs (182) are arranged in a three by six serial/parallel interconnection (180) comprising three sets of six first LEDs (182) connected in series. The three sets are then coupled in parallel. The serial/parallel arrangement can lower the voltage necessary to drive the first LEDs, by a driver or current controller (186), while still allowing for reduced drive currents. The interconnection (180) can also comprise jumpers (184) or interconnection nodes being placed after groups of one or more series connected first LEDs (182) and between first LEDs (182). The jumpers (184) can allow for the electrical signal applied by the driver or current controller (186)to the first LEDs (182) to bypass a failed first LED (182). For instance, if one of the first LEDs (182) failed, such as LED (182a), the electrical signal to be applied to the first LEDs (182) that follow in series could be interrupted. By including bypass jumpers (184), and in particular bypass jumper (184a), the electrical signal can bypass failed first LED (182a) through jumper (184a) such that electrical signal can pass to the first LEDs (182) following in series from the failed first LED (182a).

Figure 3:
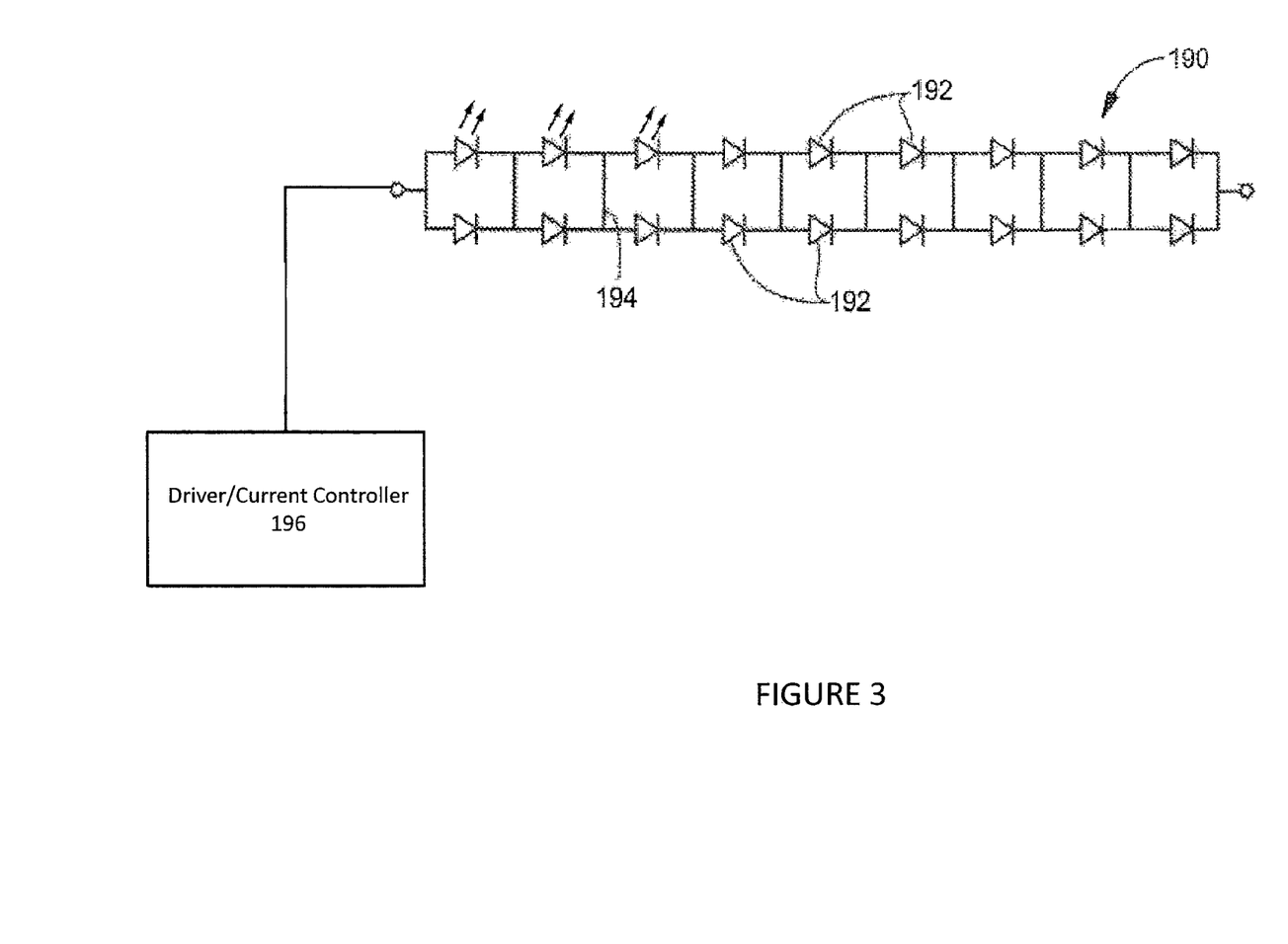
FIG. 3 illustrates a circuit diagram for LED interconnections according to one embodiment of a light emitting device of the present invention.

FIG. 3 illustrates another embodiment of a series/parallel interconnection (190) having two sets of nine first LEDs (192) coupled in series, with the two sets coupled in parallel. Jumpers (194) are included to bypass failed first LEDs (192). Different series/parallel interconnections can have different arrangements with various numbers of first LEDs coupled in series and in parallel. For example, the eighteen (18) first LEDs shown can have series LED circuits of five, six and seven, with each of the series circuits coupled in parallel. In some embodiments, the second LEDs can have a series/parallel arrangement as illustrated in any one of FIGS. 2 and 3. As in FIG. 2, a driver or current controller (196) is employed to apply electrical signal to the two sets of nine first LEDs (192).

As described herein, the electrical circuitry of a light emitting device, in some embodiments, provides a first adjusted drive current value to the first LEDs to provide a light output of the light emitting device falling within a defined second chromaticity region. In some embodiments, the second drive current value of the second LEDs remains constant when a first adjusted drive current value is provided to the first LEDs. Alternatively, in some embodiments when the first adjusted drive current value is provided to the first LEDs, the electrical circuitry additionally provides a second adjusted drive current value to the second LEDs to provide a light output of the light emitting device falling within the defined second chromaticity region.

In some embodiments wherein the second drive current value to the second LEDs remains constant, the ratio of the first adjusted drive current value to the second drive current value ranges from about 0.7 to about 1.3. In some embodiments wherein a second adjusted drive current value is also provided to the second LEDs, the ratio of the first adjusted drive current value to the second adjusted drive current value ranges from about 0.7 to about 1.3.

The first and second adjusted drive current values, in some embodiments, are based on the identity and number of the first and second LEDs. The first and second adjusted drive current values, in some embodiments, are further based on one or more second operating parameters of the light emitting device.

In some embodiments, the one or more second operating parameters of a light emitting device comprise a second junction temperature ($T_{2j}$) of the first and second LEDs. A second junction temperature, in some embodiments, is determined according to a second solder point temperature ($T_{2sp}$) of the first and second LEDs. In some embodiments, $T_{2sp}$ is greater than $T_{1sp}$. In other embodiments, $T_{2sp}$ is less than $T_{1sp}$. In some embodiments, $T_{2sp}$ ranges from about 25° C. to about 105° C. In some embodiments, $T_{2sp}$ ranges from about 50° C. to about 85° C. In another embodiment, one or more second operating parameters comprises the amount of time the first and/or second LEDs have been in operation.

A first adjusted drive current value, in some embodiments, ranges from about 20 mA to about 700 mA. In some embodiments, a first adjusted drive current value ranges from about 50 mA to about 250 mA. In another embodiments, a first drive current value ranges from about 100 mA to about 200 mA. In some embodiments, a first adjusted drive current value ranges from about 140 mA to about 190 mA. A first adjusted drive current value, in some embodiments, ranges from about 150 mA to about 180 mA.

A second adjusted drive current value, in some embodiments, ranges from about 20 mA to about 700 mA. In some embodiments, a second adjusted drive current value ranges from about 50 mA to about 250 mA. In another embodiments, a second drive current value ranges from about 100 mA to about 200 mA. In some embodiments, a second adjusted drive current value ranges from about 140 mA to about 190 mA. A second adjusted drive current value, in some embodiments, ranges from about 150 mA to about 180 mA.

The defined second chromaticity region can be chosen to encompass any area of the CIE 1931 chromaticity diagram that at least partially does not overlap with the first chromaticity region. In some embodiments, the defined second chromaticity region does not overlap with the first chromaticity region. Moreover, the defined second chromaticity region, in some embodiments, approximates a 7-step MacAdam ellipse. In another embodiment, the defined second chromaticity region approximates a 4-step MacAdam ellipse. Additionally, in some embodiments, the defined second chromaticity region at least partially overlaps with one or more bins as set forth in ANSI C78.377A. In some embodiments, the defined second chromaticity region falls within one or more bins set forth in ANSI C78.377A.

In some embodiments, the defined second chromaticity region comprises one or more of the quadrangles listed in Table II.

TABLE II

Defined Second Chromaticity Regions based on the CIE 1931 Chromaticity Diagram

| Chromaticity Region | x | y |
|---|---|---|
| I | 0.4380 | 0.4117 |
|  | 0.4443 | 0.4212 |
|  | 0.4508 | 0.4186 |
|  | 0.4445 | 0.4092 |
| J | 0.4445 | 0.4092 |
|  | 0.4508 | 0.4186 |
|  | 0.4573 | 0.4160 |
|  | 0.4510 | 0.4067 |
| K | 0.4510 | 0.4067 |
|  | 0.4573 | 0.4160 |
|  | 0.4638 | 0.4134 |
|  | 0.4573 | 0.4042 |
| L | 0.4573 | 0.4042 |
|  | 0.4638 | 0.4134 |
|  | 0.4701 | 0.4109 |
|  | 0.4636 | 0.4018 |
| M | 0.4636 | 0.4018 |
|  | 0.4701 | 0.4109 |
|  | 0.4764 | 0.4084 |
|  | 0.4698 | 0.3994 |
| N | 0.4698 | 0.3994 |
|  | 0.4764 | 0.4084 |
|  | 0.4825 | 0.4059 |
|  | 0.4760 | 0.3970 |
| O | 0.4760 | 0.3970 |
|  | 0.4825 | 0.4059 |
|  | 0.4887 | 0.4035 |
|  | 0.4820 | 0.3946 |
| P | 0.4820 | 0.3946 |
|  | 0.4887 | 0.4035 |
|  | 0.4947 | 0.4011 |
|  | 0.4880 | 0.3923 |

Figure 1:
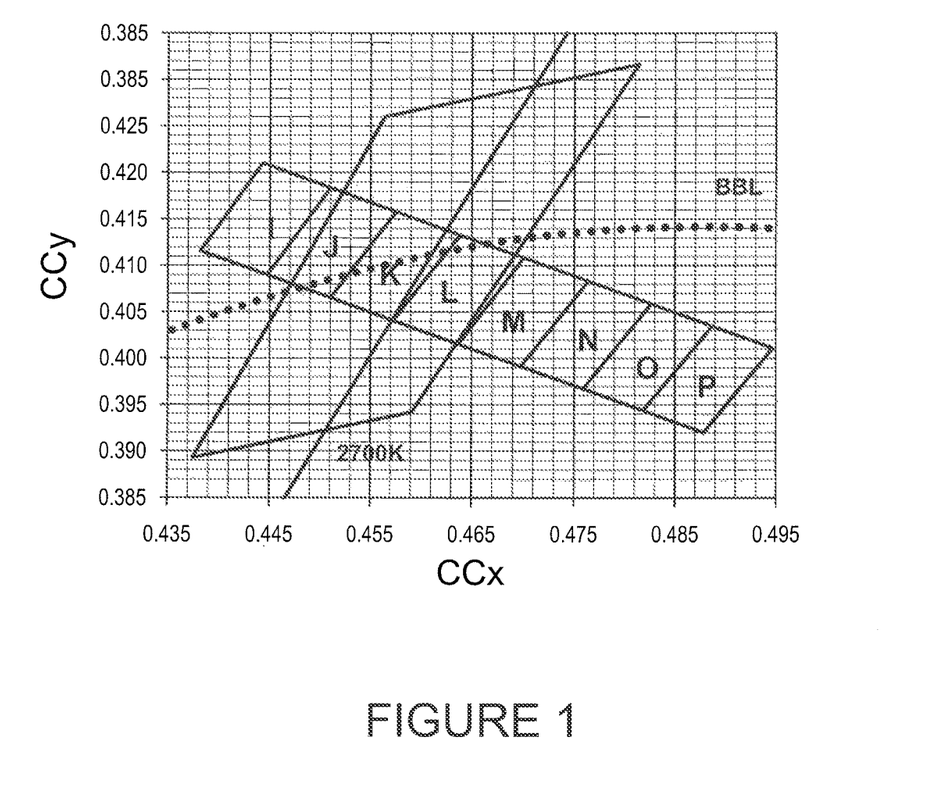
FIG. 1 illustrates defined second chromaticity regions on the CIE 1931 chromaticity diagram according to one embodiment of the present invention.

FIG. 1 illustrates quadrangles I-P on the CIE 1931 chromaticity diagram in relation to one or more bins as set forth in ANSI C78.377A.

In some embodiments, a light emitting device of the present invention comprises a reference guide providing a listing of first adjusted drive current values to achieve a light output of the light emitting device falling within the defined second chromaticity region. The first adjusted drive current values, in some embodiments, are based on the one or more second operating parameters of the light emitting device. As a result, in some embodiments, the first adjusted drive current value can be selected from the reference guide according to the one or more second operating parameters of the light emitting device to provide a light output from the light emitting device falling within the defined second chromaticity region.

In some embodiments wherein a second adjusted drive current value is provided to the second LEDs, the reference guide can additionally comprise a listing of the second adjusted drive current values. In such embodiments, the first adjusted drive current value and the second adjusted drive current value can be selected from the reference guide according to one or more second operating parameters of the light emitting device to provide a light output from the light emitting device falling within the defined second chromaticity region.

In some embodiments, a reference guide is provided in an non-electronic format. In one embodiment, for example, a reference guide is provided in a paper or other printed format. In other embodiments, a reference guide is provided in an electronic format. In some embodiments, for example, the reference guide is provided on a computer readable medium.

When provided in an electronic format, in some embodiments, the reference guide can be stored in the memory or other electronic storage of a driver, current controller, computer or other programmable apparatus of the light emitting device. In other embodiments, the reference guide in electronic format can be stored in the memory or other electronic storage of a programmable device external to the light emitting device having the capability of interfacing with the light emitting device to provide a first adjusted drive current and/or second adjusted drive current to the first and/or second LEDs. In some embodiments, the reference guide is stored as a look-up table comprising the first and/or second adjusted drive current values.

A reference guide of a light emitting device described herein can be developed by any desired method. In some embodiments, a reference guide of a light emitting device is developed by theoretical calculations based on various parameters of the light emitting device including, but not limited to, the identity and number of first LEDs, second LEDs and/or any additional LEDs as well as the identity of second operating parameter(s). In other embodiments, a reference guide is developed experimentally. In some embodiments, for example, a light emitting device is systematically tested according to various second operating parameters to determine the properties of the light output. The data captured during the testing can be used in the generation of the reference guide. Additionally, in some embodiments, a reference guide is developed according to a combination of theoretical calculations and experimental data.

A light emitting device, in some embodiments, further comprises one or more non-optical detection apparatus. Non-optical detection apparatus, in some embodiments, are operable to detect a change in one or more second operating parameters of the light emitting device. In one embodiment, for example, a non-optical detection apparatus comprises a thermistor or thermocouple for detecting a change in $T_{2sp}$.

As understood by one of skill in the art, the position of the thermistor or thermocouple in a light emitting device can affect the temperature measured by the thermistor or thermocouple. In some embodiments, a thermistor or thermocouple is positioned adjacent to the first LEDs and/or second LEDs. In other embodiments, a thermistor or thermocouple is spaced apart from the first LEDs and/or second LEDs. In some embodiments, a plurality of thermistors and/or thermocouples are used to detect a change in $T_{2sp}$.

In some embodiments, a correction factor can be applied to a temperature measured by a thermistor or thermocouple, wherein the correction factor is related to the specific positioning of the thermistor or thermocouple in the light emitting device. A correction factor, in some embodiments, can be determined by theoretical calculations and/or experimental data. Moreover, in some embodiments, the first and/or second adjusted drive current values provided in a reference guide can reflect the position of a thermistor and/or thermocouple in a light emitting device.

In some embodiments, a non-optical detection apparatus comprises a clock or timer for monitoring the operating time of the first and/or second LEDs. A clock or timer, in some embodiments, can have one or more time settings corresponding to expected dimming signal in the first and/or second LEDs.

When the non-optical detection apparatus detects a change in a second operating parameter, a first corrective drive current value can be provided to the first LEDs and/or a second corrective drive current value can be provided to the second LEDs to maintain the light output of the light emitting device in the defined second chromaticity region. In some embodiments, first and/or second corrective drive current values are provided by the reference guide.

In one embodiment, for example, a thermistor detects a change in the $T_{2sp}$ of the first and second LEDs. The reference guide is subsequently referenced to provide a first corrective drive current value to the first LEDs and/or a second corrective drive current value to the second LEDs based on the magnitude of change in the $T_{2sp}$ to maintain the light output of the light emitting device in the defined second chromaticity region. In some embodiments, a first and/or second corrective drive current value is manually entered to a driver or other current controller. In other embodiments, a first and/or second corrective drive current value can be automatically provided to the first and/or second LEDs upon detection of a change in one or more of the second operating parameters. In one embodiment, for example, the non-optical detection apparatus can be linked with the driver or current controller to provide feedback of changes to second operating parameter(s) thereby allowing the driver or current controller to provide a first and/or second corrective drive current value to the first and/or second LEDs.

In view of the foregoing, the chromaticity of light output by the light emitting device can be controlled without an optical detection apparatus. Obviating the need for an optical detection apparatus for monitoring light output simplifies construction of the light emitting device and can make the light emitting device generally applicable to various luminaire constructions. Moreover, exclusion of an optical detection apparatus, in some embodiments, can reduce the cost and time to manufacture the light emitting device.

In some embodiments, a light emitting device further comprises a sensor operable to detect the light output of the light emitting device falling within the first chromaticity region when the first and second LEDs are operated at one or more first operating parameters. In response to the detection of the light output falling within the first chromaticity region by the sensor, a first adjusted drive current value is provided to the plurality of first LEDs to provide the light output of the light emitting device falling in the defined second chromaticity region. In some embodiments, a second adjusted drive current is also provided to the plurality of second LEDs to provide the light output of the light emitting device falling within the second defined chromaticity region. As provided herein, in some embodiments, the first and/or second adjusted drive currents are based on one or more second operating parameters of the light emitting device.

Light emitting devices of the present invention further comprise at least one optic. In some embodiments, the first LEDs and the second LEDs are disposed under a single optic. In other embodiments, an individual optic can be associated with each to the first LEDs and/or second LEDs. Moreover, in some embodiments, individual LED optics can be used in conjunction with a single outer optic.

Any desired optic not inconsistent with the objectives of the present invention can be used. In some embodiments, a single optic has a hemispherical shape. In other embodiments, a single optic has an ellipsoidal, bullet, flat, hexagonal or square shape. Hemispheric optics, in some embodiments, can provide for an essentially lambertian emission with at least 120 degrees FWHM, while the other optical lenses can have other shapes to provide for different emission patterns at different angles.

For hemispheric embodiments, different optic sizes can be used. In some embodiments, hemispheric optics have a size greater than about 5 mm in diameter, with one embodiment having a size greater about 11 mm in diameter. In some embodiments, the LED array size to lens diameter ratio should be less than about 0.6 or less than about 0.4. For such hemispheric optics, the focal point of the lens can be essentially at the same horizontal plane as the emission region of the first and second LEDs.

In other embodiments, an optic can have a diameter of about the same or larger than the distance across or width of the LED array. For a circular LED array, the diameter of the lens can be about the same as or larger that the diameter of the LED array. The focal point for such optics, in some embodiments, is below the horizontal plane created by the emitting region of the LEDs. The advantage of such lenses is the ability to spread the light over larger solid emission angles and therefore allow for a broader illuminated area.

Various materials can be used for optics such as silicones, thermoplastics, thermosets, epoxies or glass, with a suitable material being compatible with one or more molding processes. Silicone, in some embodiments, is suitable for molding and provides acceptable optical transmission properties. Silicone, in some embodiments, can also withstand subsequent reflow processes and does not significantly degrade over time. It is understood that optics can also be textured or coated with anti-reflection coatings to improve light extraction or can contain materials such as phosphors or scattering particles.

In some embodiments, a molding process is used that simultaneously provides optics over a plurality of LED arrays on a submount panel. One such molding process is referred to as compression molding.

In some embodiments, a light emitting device described herein can operate at any desired color temperature. A light emitting device, in some embodiments, can operate at color temperatures from about 2700K to about 6000K. Moreover, in some embodiments, a light emitting device has a luminous efficiency of greater than about 100 lumens per Watt (lm/W). A light emitting device, in some embodiments, has a $L_{70}$ lifetime of greater than about 50,000 hours. Additionally, in some embodiments, a light emitting device described herein has a thermal resistance of about 2° C./W.

In one embodiment, a light emitting device has a luminous efficiency of at least about 105 lm/W at a color temperature of 2700K. Moreover the light emitting device can have a color rendering index (CRI) of at least 90 at a color temperature of 2700K (CCT). In some embodiments, the light emitting device has a CRI of at least 92 at 2700K.

Figure 4:
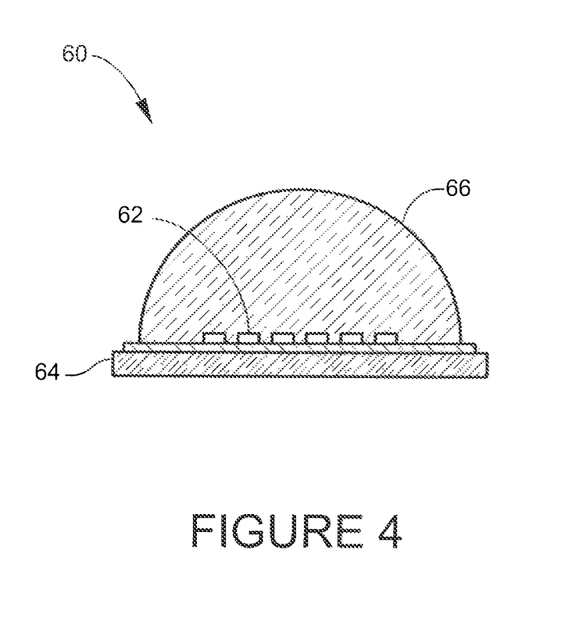
FIG. 4 illustrates a cross-sectional view of light emitting device according to one embodiment of the present invention FIG. 5 illustrate a top plan view of electrical circuitry of a light emitting device according to one embodiment of the present invention.

The foregoing embodiments and principles are further illustrated by the following non-limiting embodiment of a light emitting device of the present invention. FIG. 4 illustrates a cross sectional view of a light emitting device according to one embodiment of the present invention. The light emitting device (60) illustrated in FIG. 4 comprises an array of first and second LEDs (62) totaling 26 LEDs mounted on the surface of a submount (64).

The arrays of red first and white second LEDs (62) are preferably mounted on a substantially planar surface of the submount (64) and are arranged under a single optical lens element (66). The arrays of red first and white second LEDs can be arranged in any desired format on the submount (64) to provide desirable mixing of the colors emitted from the LEDs (62). In some embodiments, the red first LEDs and white second LEDs are arranged in a symmetrical format on the submount (64). In other embodiments, the red first LEDs and white second LEDs are arranged in an asymmetrical format on the submount (64).

The submount (64) can be formed of various materials. In one embodiment, the submount (64) comprises an electrically insulating material, such as a dielectric element, wherein the submount is disposed between the red first and white second LED arrays and the backside of the light emitting device. In some embodiments, the submount (64) comprises a ceramic such as alumina, aluminum nitride, silicon carbide or a polymeric material such as polyamide, polyester, etc. In some embodiments, polymeric materials comprise fiber reinforcements, such as glass fibers. The submount (64), in some embodiments, comprises a material having a high thermal conductivity. In some embodiments, dielectric materials such as aluminum nitride and silicon carbide demonstrate high thermal conductivities.

Additionally, in some embodiments, the submount (64) can comprise a reflective material, such as reflective ceramic or metallic layers like silver, to enhance light extraction from the light emitting device (60). In other embodiments, the submount (64) can comprise a printed circuit board (PCB), alumina, sapphire or silicon or any other suitable material, such as T-Clad thermal clad insulated substrate material, available from The Bergquist Company of Chanhassen, Minn. For PCB embodiments, different PCB types can be used such as standard FR-4 PCB, metal core PCB, or any other type of printed circuit board.

The size of the submount (64) of a light emitting device (60) can vary depending on several factors such as the size and number of the first and second LEDs. In one embodiment, the sides of the submount can be approximately 12 mm by 13 mm. Moreover, the submount (64) can have other shapes including circular, oval, rectangular, hexagonal or other multiple sided shapes.

Figure 5:
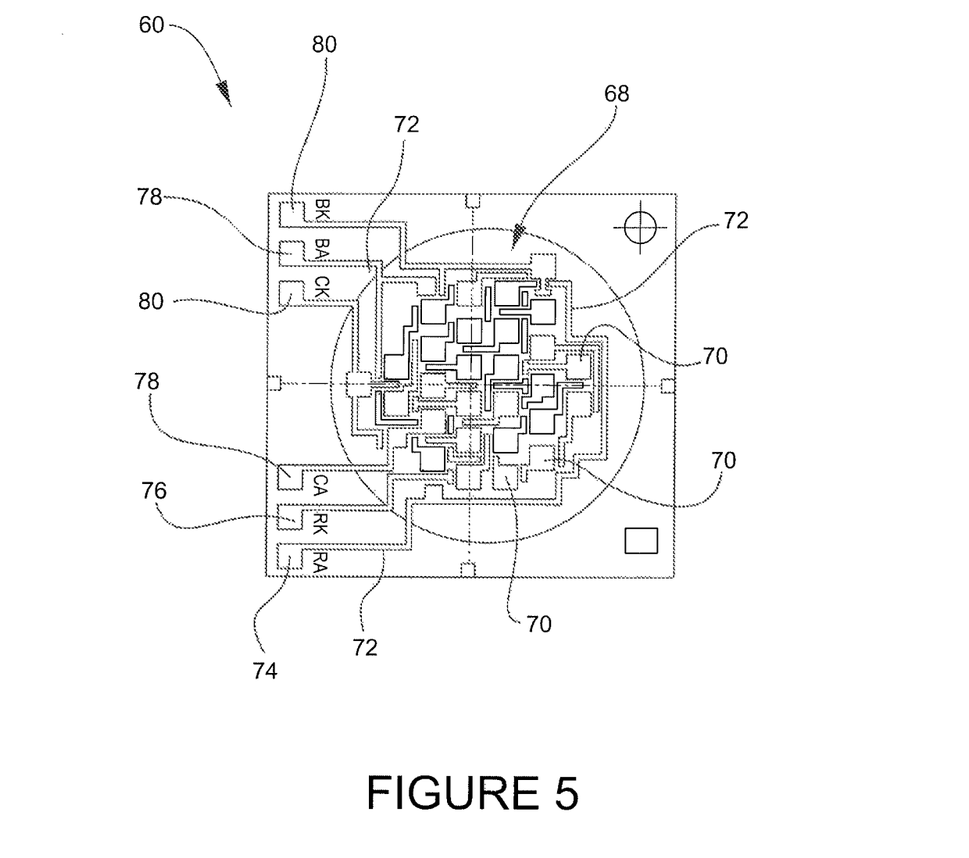

Referring now to FIG. 5, the top surface of the submount (64) is shown having a planar surface with patterned electrically conductive features (68) that can include die attach pads (70) and interconnecting conductive traces (72). The electrically conductive features (68) provide conductive paths for electrical connection of the arrays of red first LEDs and white second LEDs (62) using known contacting methods. Each of the red first LEDs and white second LEDs (62) can be mounted to a respective die attach pad (70) using known methods and materials. In some embodiments, the red first and white second LEDs (62) can be mounted and electrically connected to the conductive traces (72) using known surface mount or wire bonding methods depending on the geometry of the first and second LEDs. Alternatively, the red first and/or white second LEDs can comprise flip chip LEDs for surface mounting techniques described further herein.

The attach pads (70) and interconnecting traces (72) can comprise various materials, such as metals or other electrically conductive materials. In one embodiment, the attach pads (70) and interconnecting traces (72) comprise copper and are deposited using known techniques such as plating. In one embodiment of a deposition process, a titanium adhesion layer and copper seed layer are sequentially sputtered onto a substrate surface. About 75 μm of copper is subsequently plated onto the copper seed layer, although different metal thicknesses may be used. The resulting copper layer being deposited can subsequently be patterned using standard lithographic processes. In other embodiments the copper layer can be sputtered using a mask to form the desired pattern.

In another embodiment, some or all of the conductive features (68) can comprise other materials beyond copper. In one embodiment, for example, die attach pads (70) can be plated or coated with additional metals or materials to the make the pads more suitable for mounting the red first or white second LEDs. The attach pads (70), in some embodiments, can be plated with adhesive or bonding materials, or reflective and barrier layers.

In some embodiments, the 10 red LEDs are connected in series to produce the array of first LEDs. Moreover, in some embodiments, 8 phosphor-based white LEDs are connected in series to provide one array of second LEDs and 8 phosphor-based white LEDs are connected in series to provide the remaining array of second LEDs.

The submount (64) comprises bond pads for applying a respective electrical signal to each of the white LED arrays and the red LED array. As illustrated in FIG. 5, anode (74) and cathode (76) bond pads are provided on the surface of the submount (64) for applying an electrical signal to the red first LEDs. Anode (78) and cathode (80) bond pads are also provided on the surface of the submount for applying respective electrical signals to the two arrays of white second LEDs. The LED submount (64), in some embodiments, can include markings to assist in making the correct electrical connection with the proper bond pads for the red first LEDs, designated RK/RA, and the bond pads for the two arrays of white second LEDs designated CK/CA and BK/BA respectively. The conductive traces (72) provide the interconnect scheme for the red LED array and two white LED arrays.

Electrical signals can be applied to the light emitting device (60) by providing one or more external electrical contacts to the anode (74)/cathode (76) bond pads of the array of red first LEDs and the anode (78)/cathode (80) bond pads of the two arrays of white second LEDs. In some embodiments, external electrical contacts can be provided by wire or ribbon bonding or other connection methods such as the soldering of leads, special connectors or mounting the light emitting device (60) to conductive paths on, for example, a PCB.

In the present embodiment, the light emitting device (60) is arranged for mounting using surface mount technology. The light emitting device (60) comprises surface mount pads formed on the back surface of the submount (64), the surface mount pads at least partially in alignment with the anode (74)/cathode (76) bond pads of the array of red first LEDs and the anode (78)/cathode (80) bond pads of the two arrays of white second LEDs.

Conductive vias, in some embodiments, are formed through the submount (64) between the corresponding surface mount and anode/cathode bond pads, such that when a signal is applied to the surface mount pads, the signal is conducted to its corresponding anode/cathode bond pad through the appropriate via. The surface mount pads allow for surface mounting of the light emitting device (60) with the electrical signal to be applied to the light emitting device (60) through the surface mounting pads. The vias and surface mount pads can be made of various materials deposited using different techniques, such as those used for the die attach pads (70).

In some embodiments, surface mount pads and vias can be arranged in various ways and can have different shapes and sizes. In other embodiments, a light emitting device can use structures other than vias, including one or more conductive traces on the surface of the submount between the mounting pads and contact pads, such as along the side surface of the submount.

In some embodiments, a solder mask can also be included on the submount's (64) top and/or bottom surface at least partially covering the conductive traces (72), portions of the other conductive features or portions of the surface. In some embodiments, the bond pads and die attach pads are left uncovered, with the solder mask protecting the conductive traces (72) and other covered features during subsequent processing steps, such as the mounting of the first and second LEDs (62) to the die attach pads (70).

The light emitting device (60) can also comprise elements to protect against damage from electrostatic discharge (ESD). Additional protective components can be located on or off the submount (64). Protective elements, in some embodiments, comprise vertical silicon (Si) Zener diodes, different LEDs arranged in parallel and reverse biased to the red first and white second LEDs (62), surface mount varistors and/or lateral Si diodes. In some embodiments using a Zener diode, the diode can be mounted to the separate attach pad using known mounting techniques.

In some embodiments, the red first and white second LEDs (62) are arranged on the submount (64) to minimize the size of the submount (64) and the footprint of the light emitting device, and to enhance color mixing between the red first LEDs and white second LEDs. To enhance dissipation of heat generated by the first and second LEDs (62) during operation, the light emitting device (60) can comprise one or more integrated features to enhance thermal dissipation. In one embodiment, thermal dissipation on the front side of the submount (64) is enhanced by constructing die attach pads that are thermally conductive and extend on the front surface of the submount (64) beyond the edge of the red first and white second LEDs (62). Heat from each of the first and second LEDs (62) can spread into the associated die attach pad and beyond the width of the extended die pads providing a larger surface area to dissipate heat.

To further enhance thermal dissipation, the light emitting device (60), in some embodiments, can further comprise a neutral metallized pad on the back surface of the submount (64). Regarding the metallized pad, neutral refers to the pad not being electrically connected to red first and/or white second LEDs (62) or the electrical features 68 (as shown in FIG. 5). In some embodiments, the metallized pad is made of a thermally conductive material and can be in at least partial vertical alignment with the first and second LEDs. Heat from the red first and white second LEDs that does not spread through the attach pads and traces (70), (72) can be conducted into the submount (64) directly below and around the red first and white second LEDs (62). The metallized pad can assist with heat dissipation by allowing the heat below and around the red first and white second LEDs (62) to spread into the metallized pad where it can subsequently dissipate or be more readily conducted to suitable heat sinks. The metallized can have any desired shape and, in some embodiments, can comprise a plurality of pads having different shapes and sizes.

In some embodiments, heat can additionally conduct from the top surface of the submount (64), through the vias, where the heat can spread into the first and second mounting pads where it can also dissipate. Additional heat dissipation structures and arrangements are further provided in U.S. patent application Ser. Nos. 12/154,691 and 12/156,995 which are each hereby incorporated by reference in their entirety.

As described herein, an optic or lens (66) is formed or disposed on the top surface of the submount (64) over the red first and white second LEDs (62). In some embodiments, the optic (66) provides environmental and/or mechanical protection as well as beam shaping while simultaneously aiding the light extraction from the red first and white second LEDs (62). The optic (66) can be in different locations on the submount (64) and, in some embodiments, is centrally aligned with the arrays of the red first and white second LEDs (62). In some embodiments the optic (66) is formed in direct contact with the red first and white second LEDs (62) and the top surface of the submount (64). In other embodiments there may be an intervening material or layer between the red first and white second LEDs (62) and the optic (66), such as a waveguide or air gap.

In some embodiments, the light emitting device (60) is operated at the following first operating parameters to provide a light output from the light emitting device (60) falling within one of the first chromaticity regions provided in Table I herein.
First Drive Current Value for Red First LEDs=150 mA
Second Drive Current Value for White Second LEDs=150 mA
$T_{1sp}$=25° C.

The light emitting device (60) further comprises a reference guide comprising a listing of first adjusted drive current values for the red first LEDs to achieve a light output of the light emitting device falling within a defined second chromaticity region. The defined second chromaticity region comprises one or more regions provided in Table II herein. Additionally, the first adjusted drive current values are based on one or more second operating parameters of the light emitting device (60).

In the present embodiment, the first adjusted drive current value for the red first LEDs is selected from the reference guide according to the second operating parameter $T_{2sp}$ of the light emitting device (60) to provide a light output from the light emitting device (60) falling within the defined second chromaticity region.

Table III is a reference guide providing first adjusted drive current values for the red first LEDs based on the second operating parameter $T_{2sp}$ to provide the light emitting device (60) a light output falling within one of the defined second chromaticity regions of Table II.

TABLE III

First Adjusted Drive Current Values

| $T_{2sp}$ | Chromaticity Region | Red First LEDs | White Second LEDs | |
|---|---|---|---|---|
| 50° C. | K | 175 | 150 | mA |
| | L | 160 | 150 | |
| | M | 150 | 150 | |
| | N | 135 | 150 | |
| 55° C. | K | 177 | 150 | mA |
| | L | 165 | 150 | |
| | M | 152 | 150 | |
| | N | 140 | 150 | |
| 60° C. | K | 180 | 150 | mA |
| | L | 167 | 150 | |
| | M | 155 | 150 | |
| | M | 143 | 150 | |
| 65° C. | K | 185 | 150 | mA |
| | L | 172 | 150 | |
| | M | 158 | 150 | |
| | N | 147 | 150 | |
| 70° C. | K | 187 | 150 | mA |
| | L | 175 | 150 | |
| | M | 163 | 150 | |
| | N | 150 | 150 | |
| 75° C. | K | 192 | 150 | mA |
| | L | 177 | 150 | |
| | M | 166 | 150 | |
| | N | 153 | 150 | |
| 80° C. | K | 196 | 150 | mA |
| | L | 182 | 150 | |
| | M | 170 | 150 | |
| | N | 157 | 150 | |
| 85° C. | K | 197 | 150 | mA |
| | L | 187 | 150 | |

TABLE III-continued

First Adjusted Drive Current Values

| $T_{2sp}$ | Chromaticity Region | Red First LEDs | White Second LEDs |
|---|---|---|---|
| | M | 172 | 150 |
| | N | 160 | 150 |

A light output in any defined second chromaticity region K-N can be achieved at any of the listed $T_{2sp}$ by providing the corresponding first adjusted drive current value to the red first LEDs. For example, if a light output of the light emitting device is desired to fall within defined second chromaticity region K at a $T_{2sp}$ of 70° C., a first adjusted drive current value of 187 mA is provided to the red first LEDs while maintaining the second drive current value of 150 mA to the white second LEDs. The reference guide permits a user of the light emitting device to tailor the light output of the light emitting device to the desired chromaticity region based on $T_{2sp}$ and/or other second operating parameter(s). As a result, the light output of light emitting devices of the present invention, in some embodiments, is not restricted to a color based on the initial binning of the first LEDs and second LEDs.

The first adjusted drive current value can be provided to the first red LEDs through the electrical circuitry described herein allowing for independent control of the red first LEDs and white second LEDs. In some embodiments, a first driver or current controller is used for the red first LEDs and a second driver or current controller is used for the white second LEDs. In another embodiment, a single driver or current controller having multiple independent channels is used for the electrical control of the red first LEDs and the white second LEDs.

In some embodiments, the reference guide of Table III is provided in an non-electronic format. In one embodiment, for example, the reference guide is provided in a paper format. In other embodiments, the reference guide is provided in an electronic format. In some embodiments, for example, the reference guide is provided on a computer readable medium. When provided in an electronic format, in some embodiments, the reference guide can be stored on a driver, current controller or other programmable apparatus of the light emitting device (60). In other embodiments, the reference guide in electronic format can be stored on a programmable device external to the light emitting device (60) having the capability of interfacing with the light emitting device to provide a first adjusted drive current value to the red first LEDs.

As provided herein, the light emitting device (60), in some embodiments, further comprises one or more non-optical detection apparatus. Non-optical detection apparatus, in some embodiments, are operable to detect a change in the one or more second operating parameters of the light emitting device. In the present embodiment, for example, a non-optical detection apparatus comprises a thermistor for detecting a change in $T_{2sp}$.

When the thermistor detects a change in $T_{2sp}$, a first corrective drive current value can be provided to the red first LEDs to maintain the light output of the light emitting device in the defined second chromaticity region. In the present embodiment, the corrective drive current value is provided by the reference guide of Table III.

As described herein, for example, a first adjusted drive current value of 187 mA is provided to the red first LEDs and a second drive current value of 150 mA is provided to the white second LEDs at a $T_{2sp}$ of 70° C. to provide a light output from the light emitting device (60) falling with the defined second chromaticity region K of Table II herein. Over the course of operating the light emitting device (60), the thermistor detects a change in $T_{2sp}$ of +10° C., thereby making $T_{2sp}$ 80° C.

In response to the change in $T_{2sp}$, the reference guide is referenced to provide a first corrective drive current of 196 mA to the red first LEDs to maintain the light output of the light emitting device in defined second chromaticity region K.

In some embodiments, the first corrective drive current value is manually entered to the driver or other current controller. In other embodiments, the first corrective drive current value can be automatically provided to the red first LEDs upon detection of a change in the $T_{2sp}$. In one embodiment, for example, the thermistor can be linked with the driver or current controller to provide feedback of changes to $T_{2sp}$ thereby allowing the driver or current controller to automatically provide a first corrective drive current value to the red first LEDs.

In view of the foregoing, the chromaticity of light output by the light emitting device (60) can be controlled without an optical detection apparatus. Obviating the need for an optical detection apparatus for monitoring light output simplifies construction of the light emitting device (60) and can make the light emitting device (60) generally applicable to various luminaire constructions. Moreover, exclusion of an optical detection apparatus, in some embodiments, can reduce the cost and time to manufacture the light emitting device (60).

In another aspect, the present invention provides methods of controlling the color of light emitted from a light emitting device. In one embodiment, a method of controlling the color of light emitted from a light emitting device comprises operating a plurality of first LEDs and a plurality of second LEDs at one or more first operating parameters to provide a light output of the light emitting device falling within a first chromaticity region, defining a second chromaticity region and providing a first adjusted drive current value to the plurality of first LEDs to provide the light output of the light emitting device falling within the defined second chromaticity region. Moreover, in some embodiments, a method of controlling the color of light emitted from a light emitting device further comprises providing a second adjusted drive current value to the plurality of second LEDs to provide the light output of the light emitting device falling within the defined second chromaticity region. In some embodiments, the first and/or second adjusted drive current values are based on one or more second operating parameters of the light emitting device.

The first and second LEDs can comprise any of the same described herein. In some embodiments, the one or more first operating parameters and one or more second operating parameters can comprise any of the same described herein. Moreover, in some embodiments, the first chromaticity region and the defined second chromaticity region are consistent with any of the same described herein.

In some embodiments of methods of controlling the color of light emitted from a light emitting device, providing a first adjusted drive current value comprises selecting the first adjusted drive current value from a reference guide. Similarly, in some embodiments, providing a second adjusted drive current value in conjunction with the first adjusted drive current value comprises selecting the second adjusted drive current value from a reference guide. In some embodiments, first adjusted drive current values and second adjusted drive current value are provided by a single reference guide. In other embodiments, first adjusted drive current values and second adjusted drive current value are provided by multiple reference guides.

A reference guide suitable for use in some embodiments of methods of controlling the color of light emitted from a light emitting device can comprise any of the same described herein. In one embodiment, for example, a first adjusted drive current value for the first LEDs is selected from the reference guide provided in Table III herein.

In some embodiments, a method of controlling the color of light emitted from a light emitting device further comprises detecting a change in the one or more second operating parameters and providing a first corrective drive current value to the first LEDs and/or a second corrective drive current value the second LEDs to maintain the light output of the light emitting device in the defined second chromaticity region. In some embodiments, the first and second corrective drive current values are equal or substantially equal. In other embodiments, the first and second corrective drive current values are different.

In some embodiments, providing a first and/or second corrective drive current value comprises selecting the first and/or second corrective drive current value from the reference guide.

In another embodiment, a method of controlling the color of light emitted from a light emitting device comprises defining a chromaticity region, providing a plurality of first LEDs, providing a plurality of second LEDs, providing a first drive current value to the first LEDs and selecting a second drive current value for the second LEDs from a reference guide to achieve a light output from the light emitting device falling within the defined chromaticity region. In some embodiments, the second drive current value is based on one or more operating parameters of the light emitting device.

The defined chromaticity region can comprise any space on the CIE 1931 chromaticity diagram. In some embodiments, the defined chromaticity region comprises one or more of the quadrangles listed in Table II herein. Moreover, in some embodiments, the first and second LEDs and reference guides comprise any of the same described herein.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A light emitting device comprising:
   a plurality of first LEDs; and
   a plurality of second LEDs;
   light output of the light emitting device falling within a first chromaticity region at one or more first operating parameters; and
   electrical circuitry including one or more drivers or current controllers for providing a first adjusted drive current of predetermined value to the plurality of first LEDs and a second drive current to the plurality of second LEDs to provide the light output of the light emitting device falling within a defined second chromaticity region;
   wherein the predetermined value of the first adjusted drive current is based on binning of the first LEDs; and
   wherein a ratio of the first adjusted drive current to the second drive current ranges from 0.7 to 1.3.

2. The light emitting device of claim 1, wherein the defined second chromaticity region approximates a 7-step MacAdam ellipse.

3. The light emitting device of claim 1, wherein the defined second chromaticity region approximates a 4-step MacAdam ellipse.

4. The light emitting device of claim 1, wherein the predetermined value of the first adjusted drive current is listed on a reference guide for the light emitting device.

5. The light emitting device of claim 4, wherein the reference guide is stored in an electronic format for electronic communication with a driver or current controller of the first LEDs.

6. The light emitting device of claim 1 further comprising a light output control apparatus, wherein sensors of the light output control apparatus consist of non-optical detectors.

7. The light emitting device of claim 6, wherein the non-optical detector is a thermistor, thermocouple, timer or a combination thereof.

8. The light emitting device of claim 1, wherein the predetermined value of the first adjusted drive current is further based on one or more second operating parameters of the light emitting device, including operating temperature of the first and second LEDs in the defined second chromaticity region.

9. The light emitting device of claim 1, wherein the predetermined value of the first adjusted drive current value ranges from 20 mA to 700 mA.

10. The light emitting device of claim 1, wherein the first chromaticity region and the defined second chromaticity region do not overlap.

11. The light emitting device of claim 1, wherein the defined second chromaticity region overlaps with one or more bins defined in ANSI C78.377A.

12. The light emitting device of claim 1, wherein the defined second chromaticity region is a quadrangle on the CIE 1931 Chromaticity Diagram.

13. A method of controlling the color of light emitted from a light emitting device comprising:
defining a second chromaticity region;
providing a plurality of first LEDs;
providing a plurality of second LEDs, wherein light output of the light emitting device falls within a first chromaticity region at a first drive current for the first LEDs and a second drive current for the second LEDs;
selecting a first adjusted drive current of predetermined value for the first LEDs to achieve a light output from the light emitting device falling within the defined second chromaticity region, wherein the predetermined value is based on binning of the first LEDs; and
supplying the first adjusted drive current to the plurality of first LEDs to provide light from the light emitting device in the defined second chromaticity region, wherein the first adjusted drive current and second drive current are supplied by electrical circuitry comprising one or more drivers or current controllers and a ratio of the first adjusted drive current to the second drive current ranges from 0.7 to 1.3.

14. The method of claim 13, wherein the predetermined value of the first adjusted drive current is further based on binning of the second LEDs.

15. The method of claim 13, wherein the predetermined value of the first adjusted drive current is further based on one or more second operating parameters of the light emitting device, including operating temperature of the first and second LEDs in the defined second chromaticity region.

16. The method of claim 13, wherein the first chromaticity region and the defined second chromaticity region do not overlap.

17. The method of claim 13, wherein the defined second chromaticity region is a quadrangle on the CIE 1931 Chromaticity Diagram.

18. The method of claim 13, wherein the predetermined value of the first adjusted drive current value ranges from 20 mA to 700 mA.

19. The method of claim 13, wherein the predetermined value of the first adjusted drive current is selected from a reference guide.

20. The method of claim 19, wherein the reference guide is stored in an electronic format for electronic communication with a driver or current controller of the first LEDs.

21. The method of claim 13, wherein the first LEDs and the second LEDs have non-overlapping emission spectra.

22. The light emitting device of claim 1, wherein the predetermined value of the first drive current is further based on binning of the second LEDs.

23. A light emitting device comprising:
a plurality of first LEDs; and
a plurality of second LEDs;
light output of the light emitting device falling within a first chromaticity region at one or more first operating parameters; and
electrical circuitry including one or more drivers or current controllers for providing a first adjusted drive current of predetermined value to the plurality of first LEDs and a second drive current to the plurality of second LEDs to provide the light output of the light emitting device falling within a defined second chromaticity region;
wherein the predetermined value of the first adjusted drive current is based on one or more second operating parameters of the light emitting device, including operating temperature of the first and second LEDs in the defined second chromaticity region and a ratio of the first adjusted drive current to the second drive current ranges from 0.7 to 1.3.

24. The light emitting device of claim 23, wherein the operating temperature is the solder point temperature of the first and second LEDs.

25. The light emitting device of claim 24, wherein the solder point temperature ranges from 50° C. to 85° C.

26. The light emitting device of claim 23, wherein the defined second chromaticity region overlaps with one or more bins defined by ANSI C78.377A.

27. The light emitting device of claim 23, wherein the defined chromaticity region is a quadrangle on the CIE 1931 Chromaticity diagram.

28. The light emitting device of claim 23, wherein the predetermined value of the first adjusted drive current value ranges from 20 mA to 700 mA.

29. The light emitting device of claim 23, wherein the first chromaticity region and defined second chromaticity region do not overlap.

* * * * *